(12) United States Patent  
Sasaki

(10) Patent No.: US 7,974,648 B2  
(45) Date of Patent: Jul. 5, 2011

(54) RADIO COMMUNICATION SYSTEM, AND TRANSMITTER, RECEIVER, TRANSMITTING CIRCUIT, AND RECEIVING CIRCUIT USED FOR THE SAME

(75) Inventor: Mamoru Sasaki, Hiroshima (JP)

(73) Assignee: Hiroshima University, Hiroshima (JP)

( * ) Notice: Subject to any disclaimer, the term of this patent is extended or adjusted under 35 U.S.C. 154(b) by 42 days.

(21) Appl. No.: 12/665,264

(22) PCT Filed: Jun. 13, 2008

(86) PCT No.: PCT/JP2008/001520  
§ 371 (c)(1),  
(2), (4) Date: Dec. 17, 2009

(87) PCT Pub. No.: WO2009/150700  
PCT Pub. Date: Dec. 17, 2009

(65) Prior Publication Data  
US 2010/0216395 A1    Aug. 26, 2010

(51) Int. Cl.  
*H04B 15/00* (2006.01)
(52) U.S. Cl. .................. 455/502; 375/130
(58) Field of Classification Search .......... 455/39, 455/502; 375/146, 130  
See application file for complete search history.

(56) References Cited

U.S. PATENT DOCUMENTS

| 6,464,145 B1 * | 10/2002 | Chimura | 235/492 |
| 7,048,196 B2 * | 5/2006 | Arisawa | 235/492 |
| 2006/0062277 A1 * | 3/2006 | Friedrich et al. | 375/130 |
| 2006/0062278 A1 * | 3/2006 | Ishii et al. | 375/130 |
| 2006/0140253 A1 * | 6/2006 | Maeki et al. | 375/146 |

FOREIGN PATENT DOCUMENTS

| JP | 62-053548 | 3/1987 |
| JP | 06-276114 | 9/1994 |
| JP | 07-321683 | 12/1995 |
| JP | 2004-356773 | 12/2004 |
| JP | 2005-527337 | 9/2005 |
| JP | 2006-074679 | 3/2006 |
| JP | 2007-174028 | 7/2007 |

OTHER PUBLICATIONS

Lee, F. S. et al., "A 2.5nJ/b 0.65V 3-to-5GHz Subbanded UWB Receiver in 90nm CMOS," IEEE International Solid-State Circuits Conference, ISSCC Digest of Technical Papers, 2007, pp. 116-117 and 590.

(Continued)

*Primary Examiner* — Yuwen Pan  
(74) *Attorney, Agent, or Firm* — Foley & Lardner LLP

(57) ABSTRACT

A transmitter (1) applies current from a power supply node to a ground node in synchronization with only a rise of an input signal and transmits a transmission signal including an RF pulse signal to a receiver (2). The receiver (2) applies current from a node (231) on which precharge is performed to a ground node only at the reception of the RF pulse signal, decreases the potential of the node (231) from a precharge potential Va to 0 V, and outputs an H-level output signal by detecting the decreased potential 0 V. After receiving the RF pulse signal, the receiver (2) performs precharge to change the potential of the node (231) to the potential Va.

8 Claims, 7 Drawing Sheets

OTHER PUBLICATIONS

Roy, S. et al., "Ultrawideband Radio Design: The Promise of High-Speed, Short-Range Wireless Connectivity," Proceedings of the IEEE, vol. 92, No. 2, Feb. 2004, pp. 295-311.

Wentzloff, D. D. et al., "A 47pJ/pulse 3.1-to-5GHz All-Digital UWB Transmitter in 90nm CMOS," IEEE International Solid-State Circuits Conference, ISCC Digest of Technical Papers, 2007, pp. 118-119 and 591.

Zheng, Y. et al., "A 0.18μm CMOS Dual-Band UWB Transceiver," IEEE International Solid-State Circuits Conference, ISSCC Digest of Technical Papers, 2007, pp. 114-115 and 590.

Office Action for JP 2008-538608 mailed Nov. 4, 2008 (with English translation).

Office Action for JP 2008-538608 mailed Feb. 17, 2009 (with English translation).

* cited by examiner

RADIO COMMUNICATION SYSTEM, AND TRANSMITTER, RECEIVER, TRANSMITTING CIRCUIT, AND RECEIVING CIRCUIT USED FOR THE SAME

CROSS-REFERENCE TO RELATED APPLICATIONS

The present application is a U.S. national stage application claiming the benefit of International Application No. PCT/JP2008/001520, filed on Jun. 13, 2008, the entire contents of which is incorporated herein by reference in its entirety.

TECHNICAL FIELD

The present invention relates to a radio communication system, and a transmitter, a receiver, a transmitting circuit, and a receiving circuit used for the same. In particular, the present invention relates to a radio communication system that performs radio communication in an ultra wide band radio transmission method, and a transmitter, a receiver, a transmitting circuit, and a receiving circuit used for the radio communication system.

BACKGROUND ART

The ultra wide band (UWB) radio transmission method is one of the most advanced radio communication techniques for performing radio communication at a high data rate and with low power in a short range (S. Roy et al., "Ultrawideband Radio Design: The promise of High-Speed Short-Range Wireless Connectivity," Proc. IEEE, Vol. 92, pp. 295-311, February 2004).

A UWB communication system is useful to establish a network in an individual/body area. A high-performance pulse UWB transceiver has been suggested, and a transmission rate of 300 Mb/s has been realized with relatively high power (Y. Zheng et al., "A 0.18 μm CMOS Dual-Band UWB Transceiver," ISSCC Digest of Technical Papers, pp. 114-115, 2007).

Also, a pulse UWB receiver and a pulse UWB transmitter of low power have been suggested, and a low-power operation of 2.5 nJ/b and 47 pJ/pulse has been realized at a low data rate (F. S. Lee et al., "A 2.5 nJ/b 0.65 V 3-to-5 GHz Subband UWB Receiver in 90 nm CMOS," ISSCC Digest of Technical Papers, pp. 116-117, 2007 and D. D. Wentzloff et al., "A 47 pJ/pulse 3.1-to-5 GHz All-Digital UWB Transmitter in 90 nm CMOS," ISSCC Digest of Technical Papers, pp. 118-119, 2007).

DISCLOSURE OF INVENTION

However, the conventional UWB communication system has a problem that it is difficult to realize high communication performance while reducing power consumption.

Accordingly, the present invention has been made to solve this problem, and an object of the present invention is to provide a radio communication system with high communication performance and low power consumption.

Another object of the present invention is to provide a transmitter used for the radio communication system with high communication performance and low power consumption.

Still another object of the present invention is to provide a receiver used for the radio communication system with high communication performance and low power consumption.

Still another object of the present invention is to provide a transmitting circuit used for the radio communication system with high communication performance and low power consumption.

Still another object of the present invention is to provide a receiving circuit used for the radio communication system with high communication performance and low power consumption.

The radio communication system according to the present invention is a radio communication system performing radio communication in an ultra wide band radio transmission method and includes a transmitter and a receiver. The transmitter applies current only at a rise of an input signal including a pulse signal, thereby transmitting a transmission signal having a pulse waveform having a pulse width shorter than a pulse width of the pulse signal by radio communication. The receiver applies current only at the reception of the transmission signal transmitted from the transmitter, thereby receiving the transmission signal.

Preferably, the transmitter includes an antenna and a transmitting circuit. The transmitting circuit applies current to a first coil only at a rise of an input signal including a pulse signal, thereby inducing an induced current having a pulse waveform having a shorter pulse width than a pulse width of the pulse signal in a second coil, and applies the induced current to the antenna, so as to transmit a transmission signal having a pulse waveform by radio communication.

Preferably, the receiver includes an antenna and a receiving circuit. The receiving circuit applies current in synchronization with the reception of a transmission signal by the antenna and outputs a received signal of the received transmission signal.

Preferably, the receiving circuit includes a node, a precharge circuit, a potential changing circuit, and an output circuit. The precharge circuit performs precharge to change the potential of the node to a first potential. When the antenna receives a transmission signal, the potential changing circuit applies current from the node to a ground potential, so as to change the potential of the node from the first potential to a second potential. The output circuit outputs the received signal by detecting the second potential of the node.

Preferably, the precharge circuit stops precharge during the reception of the transmission signal and performs precharge after the reception of the transmission signal has ended.

Preferably, the receiver has an amplification factor independent of resistance and dependent on inductance and capacitance, amplifies the signal received by the antenna, and outputs the amplified signal to the receiving circuit.

Preferably, the amplification factor of an amplifier circuit increases when the inductance increases or when the capacitance decreases.

The transmitter according to the present invention is a transmitter used for a radio communication system performing radio communication in an ultra wide band radio transmission method, and includes an antenna and a transmitting circuit. The transmitting circuit applies current to a first coil only at a rise of an input signal including a pulse signal, thereby inducing an induced current having a pulse waveform having a pulse width shorter than a pulse width of the pulse signal in a second coil, applies the induced current to the antenna, and transmits a transmission signal having a pulse waveform by radio communication.

Furthermore, the receiver according to the present invention is a receiver used for a radio communication system performing radio communication in an ultra wide band radio transmission method, and includes an antenna and a receiving circuit. The receiving circuit applies current in synchronization with the reception of a transmission signal by the antenna, and outputs the received transmission signal transmitted from a transmitter.

Furthermore, according to the present invention, the transmitting circuit applies current to a first coil only when an input signal including a pulse signal exceeds a predetermined value, thereby inducing an induced current having a pulse waveform having a pulse width shorter than a pulse width of the pulse signal in a second coil, applies the induced current to the an antenna, and transmits a transmission signal having a pulse waveform.

Furthermore, according to the present invention, the receiving circuit applies current in synchronization with a received signal and outputs the received signal only at the reception of the signal.

In the radio communication system according to the present invention, the transmitter applies current and transmits a transmission signal including an RF pulse signal only at a rise of an input signal, whereas the receiver applies current and outputs a received signal only at the reception of the transmission signal. As a result, the transmitter transmits a transmission signal including an RF pulse signal only at a rise of an input signal, and the receiver detects only the transmission signal transmitted from the transmitter.

Therefore, according to the present invention, low power consumption and high communication performance can be realized in the radio communication system.

BEST MODE FOR CARRYING OUT THE INVENTION

Figure 1:
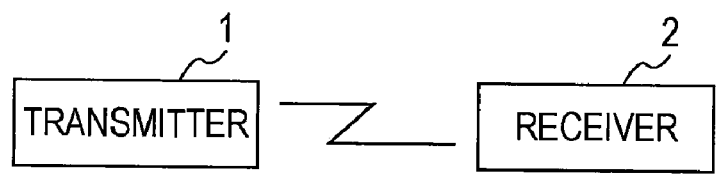
FIG. 1 is a schematic view of a radio communication system according to an embodiment of the present invention.

An embodiment of the present invention is described in detail with reference to the drawings. In the drawings, same parts or corresponding parts are denoted by same reference numerals and the description thereof is not repeated.

FIG. 1 is a schematic view of a radio communication system according to an embodiment of the present invention. Referring to FIG. 1, a radio communication system 10 according to the embodiment of the present invention includes a transmitter 1 and a receiver 2.

The transmitter 1 and the receiver 2 are placed with an interval of 1 m therebetween, for example. The transmitter 1 applies current only at a rise of an input signal including a pulse signal, thereby transmitting a transmission signal including an RF pulse signal having a pulse width shorter than that of the pulse signal to the receiver through wireless communication.

The receiver 2 applies current only at the reception of the transmission signal transmitted from the transmitter 1, thereby receiving the transmission signal.

Figure 2:
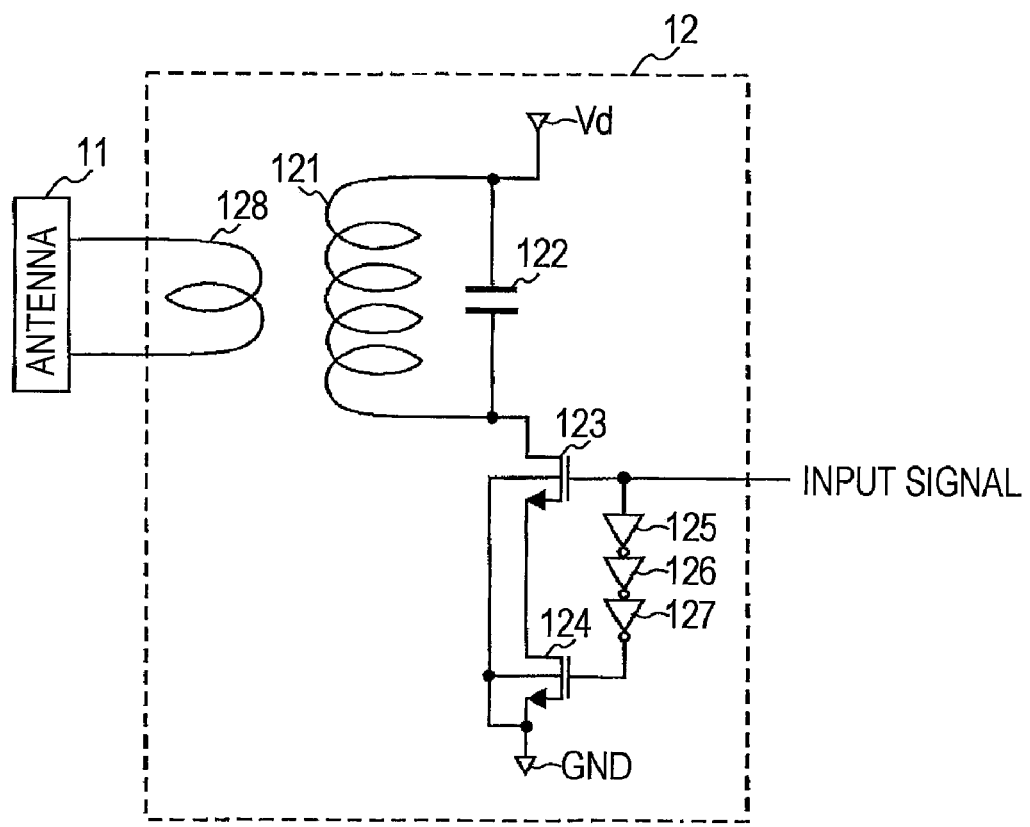
FIG. 2 is a schematic view illustrating a configuration of a transmitter illustrated in FIG. 1.

FIG. 2 is a schematic view illustrating a configuration of the transmitter 1 illustrated in FIG. 1. Referring to FIG. 2, the transmitter 1 includes an antenna 11 and a transmitting circuit 12.

The transmitting circuit 12 includes coils 121 and 128, a capacitor 122, n-type MOS (Metal Oxide Semiconductor) transistors 123 and 124, and inverters 125 to 127.

The coil 121 is connected between a power supply node Vd and a drain of the n-type MOS transistor 123. The capacitor 122 is connected in parallel to the coil 121 between the power supply node Vd and the drain of the n-type MOS transistor 123.

The two n-type MOS transistors 123 and 124 are cascaded. More specifically, in the n-type MOS transistor 123, the source is connected to a drain of the n-type MOS transistor 124, the drain is connected to the coil 121 and the capacitor 122, and the gate is connected to an input side of the inverter 125. The n-type MOS transistor 123 receives an input signal including a pulse signal at its gate.

In the n-type MOS transistor 124, the drain is connected to the source of the n-type MOS transistor 123, the source is connected to a ground node GND, and the gate is connected to an output side of the inverter 127.

The inverters 125 to 127 are connected in series between the gate of the n-type MOS transistor 123 and the gate of the n-type MOS transistor 124.

The coil 128 faces the coil 121, and the both ends thereof are connected to the antenna 11.

The n-type MOS transistor 123 is turned on in synchronization with a rise of an input signal upon receiving the input signal at the gate, and applies a current $i_L$ from the power supply node Vd to the coil 121. The coil 121 and the capacitor 122 constitute an oscillation circuit and perform oscillation.

With a change of the current $i_L$ flowing through the coil 121, a current $i_a$ is induced in the coil 128, and the induced current $i_a$ is supplied to the antenna 11.

Before the n-type MOS transistor 123 receives an input signal of an H (logic high) level at the gate, the inverter 127 outputs an H-level signal to the gate of the n-type MOS transistor 124, and then the n-type MOS transistor 124 is turned on.

Then, after a certain delay time subsequent to the turn-on of the n-type MOS transistor 123 in synchronization with a rise of the input signal, the three inverters 125 to 127 connected in series output a signal of an L (logic low) level to the gate of the n-type MOS transistor 124.

Accordingly, the n-type MOS transistor 124 is turned off by receiving the L-level signal from the inverter 127 at its gate after the certain delay time subsequent to the turn-on of the n-type MOS transistor 123.

As a result, the current $i_L$ flows through the coil 121 only during the period of the time from the turn-on of the n-type MOS transistor 123 to the turn-off of the n-type MOS transistor 124. With a change of the current $i_L$ when the current $i_L$ starts to flow through the coil 121, the current $i_a$ is induced in the coil 128.

The n-type MOS transistor 123 is turned off upon receiving an L-level signal at its gate. Thus, when an L-level input signal is input, no current $i_L$ flows through the coil 121. As a result, no current $i_a$ is induced in the coil 128 when the n-type MOS transistor 123 receives an L-level signal.

In this way, the transmitting circuit 12 applies the current $i_L$ from the power supply node Vd to the coil 121 to induce the current $i_a$ in the coil 128 only at a rise of an input signal, and applies the induced current $i_a$ to the antenna 11, thereby transmitting a transmission signal including an RF pulse signal indicating a rise of the input signal.

Figure 3:
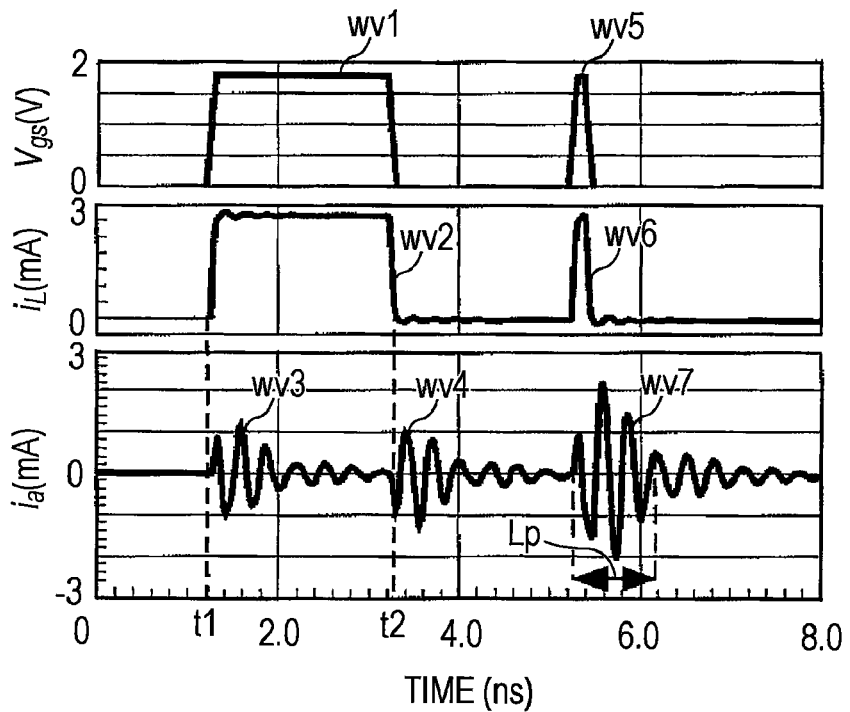
FIG. 3 is a timing chart of a voltage $V_{gs}$ and currents $i_L$ and $i_a$.

FIG. 3 is a timing chart of a voltage $V_{gs}$ and currents $i_L$ and $i_a$. Referring to FIG. 3, in the case where a single n-type MOS transistor 123 is connected between the coil 121 and the ground node GND, a current $i_L$ having a waveform wv2 flows through the coil 121 when the n-type MOS transistor 123 receives a voltage $V_{gs}$ having a waveform wv1 at its gate. As a result, a current is having a waveform wv3 is induced in the coil 128 in synchronization with a rise of the current $i_L$, and a current $i_a$ having a waveform wv4 is induced in the coil 128 in synchronization with a fall of the current $i_L$.

As a result, the current $i_L$ continuously flows through the coil 121 during the period of time from timing t1 to timing t2, but the current $i_a$ is induced in the coil 128 only when the current $i_L$ changes and is not induced in the coil 128 while the current $i_L$ is constant.

Therefore, flowing of the current $i_L$ having a constant value through the coil 121 from timing t1 to timing t2 causes a power loss.

According to the present invention, in order to overcome such a power loss, the two n-type MOS transistors 123 and 124 are cascaded, and the three inverters 125 to 127 are connected between the gates of the two n-type MOS transistors 123 and 124, so that the current $i_L$ flows through the coil 121 only at a rise of the voltage $V_{gs}$ constituting an input signal.

More specifically, the n-type MOS transistor 123 is turned on upon receiving a voltage $V_{gs}$ having a waveform wv5 at its gate, and then a current $i_L$ having a waveform wv6 flows through the coil 121. In this case, the n-type MOS transistor 123 is turned on when the voltage $V_{gs}$ rises from 0 V to 1.8 V, and then the current $i_L$ starts to flow through the coil 121.

The voltage $V_{gs}$ of 1.8 V is applied also to the input side of the inverter 125. However, it is after the delay time by the three inverters 125 to 127 has elapsed that the inverter 127 outputs a voltage of 0 V (L-level signal) to the gate of the n-type MOS transistor 124 due to an input of the voltage $V_{gs}$ of 1.8 V to the inverter 125.

Therefore, when the voltage $V_{gs}$ having the waveform wv5 is applied to the gate of the n-type MOS transistor 123, the current $i_L$ flowing through the coil 121 changes to a current having the waveform wv6 that flows only during the delay time by the three inverters 125 to 127.

Then, when the current $i_L$ having the waveform wv6 flows through the coil 121, a current is having a waveform wv7 is induced in the coil 128.

The current $i_L$ having the waveform wv6 has a pulse waveform with little period of a constant value, and thus a power loss caused by the flow of the current $i_L$ through the coil 121 from the power supply node Vd to the ground node GND can be minimized.

In the present invention, the voltage $V_{gs}$ having the waveform wv5 is applied to the gate of the n-type MOS transistor 123 in accordance with an input signal "1", the current $i_L$ having the waveform wv6 flows through the coil 121, and the current $i_a$ having the waveform wv7 is induced in the coil 128, whereby a transmission signal composed of "1" is transmitted from the antenna 11. On the other hand, when an input signal "0" is input to the gate of the n-type MOS transistor 123, no current $i_L$ flows through the coil 121, and thus no current $i_a$ is induced in the coil 128.

Therefore, the transmitting circuit 12 operates only when an input signal composed of "1" is input and transmits a transmission signal composed of "1".

Furthermore, in the present invention, an antenna with a high radiation resistance, such as a folded dipole antenna with a radiation resistance of 200 to 300Ω, is employed as the antenna 11. Magnetic energy of the coil 121 held as the current $i_L$ is radiated to space in a short time by the high radiation resistance of the antenna 11, so that a length $L_P$ of the waveform wv7 is short. The same effect can be obtained by setting the resistance of the coil 121 to a large value. The magnetic energy of the coil 121 is radiated by the antenna 11 and is consumed by the resistance of the coil 121 at the same time, so that the length $L_P$ of the waveform wv7 is short. Note that the radiation power reduces in accordance with the consumption by the resistance of the coil 121.

As described above, the radiation resistance of the antenna 11 or the resistance of the coil 121 is set to a large value so that the length $L_P$ of the current $i_a$ is short. Accordingly, even if input signals composed of "1" are sequentially input, the transmitting circuit 12 can correctly convert the respective input signals composed of "1" to a current $i_a$ and transmit the signals.

Figure 4:
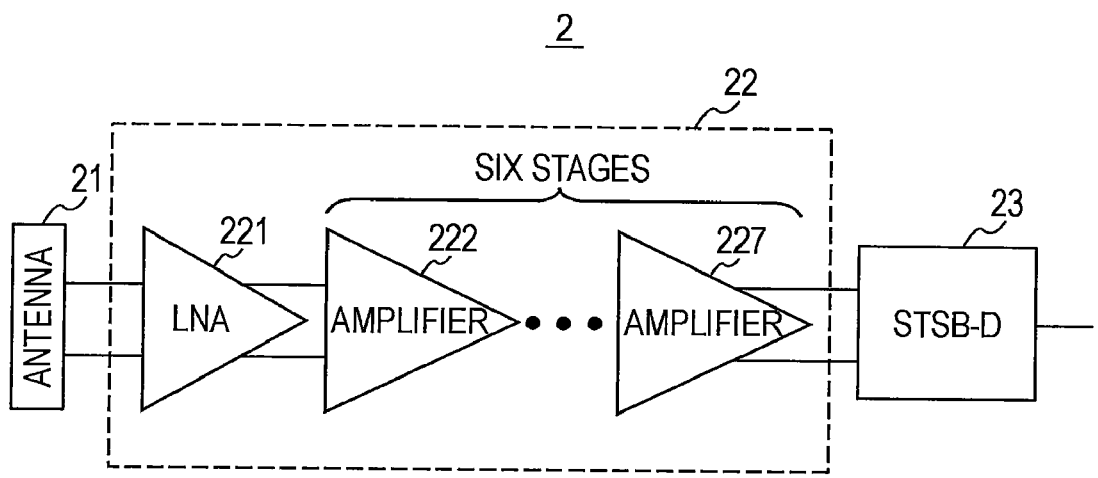
FIG. 4 is a schematic view illustrating a configuration of a receiver illustrated in FIG. 1.

FIG. 4 is a schematic view illustrating a configuration of the receiver 2 illustrated in FIG. 1. Referring to FIG. 4, the receiver 2 includes an antenna 21, an amplifier circuit 22, and a receiving circuit (STSB-D: Self-timing self-biasing detector) 23.

The antenna 21 receives a transmission signal from the transmitter 1 and outputs the transmission signal, which is a received signal, to the amplifier circuit 22.

The amplifier circuit 22 amplifies the signal received from the antenna 21 and outputs the amplified signal to the receiving circuit 23.

The receiving circuit 23 applies current only when the received signal is input from the amplifier circuit 22 and detects the received signal in synchronization with the input of the received signal.

The amplifier circuit 22 includes an LNA (Low Noise Amplifier) 221 and amplifiers 222 to 227.

The LNA 221 amplifies the signal received from the antenna 21 and outputs the signal to the amplifier 222. The amplifiers 222 to 226 receive the received signal from the LNA 221 and the amplifiers 222 to 225, and amplify the received signal to output to the amplifiers 223 to 227, respectively. The amplifier 227 receives the signal from the amplifier 226, and amplifies the received signal, to output to the receiving circuit 23.

Figure 5:
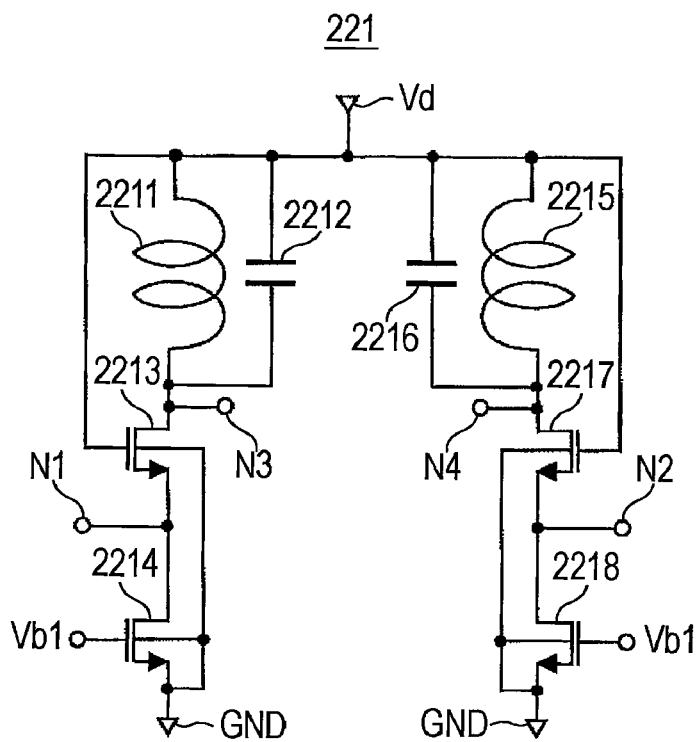
FIG. 5 is a circuit diagram illustrating a configuration of an LNA illustrated in FIG. 4.

FIG. 5 is a circuit diagram illustrating a configuration of the LNA 221 illustrated in FIG. 4. Referring to FIG. 5, the LNA 221 includes coils 2211 and 2215, capacitors 2212 and 2216, and n-type MOS transistors 2213, 2214, 2217, and 2218.

The coil 2211 is connected between a power supply node Vd and a drain of the n-type MOS transistor 2213. The capacitor 2212 is connected in parallel to the coil 2211 between the power supply node Vd and the drain of the n-type MOS transistor 2213.

In the n-type MOS transistor 2213, the drain is connected to the coil 2211 and the capacitor 2212, the source is connected to a drain of the n-type MOS transistor 2214, and the gate is connected to the power supply node Vd.

In the n-type MOS transistor 2214, the drain is connected to the source of the n-type MOS transistor 2213, the source is connected to a ground node GND, and the gate receives an operating voltage Vb1. In this case, the operating voltage Vb1 is 600 mV, for example.

The coil 2215, the capacitor 2216, and the n-type MOS transistors 2217 and 2218 are connected in the same manner as the coil 2211, the capacitor 2212, and the n-type MOS transistors 2213 and 2214, respectively.

In the LNA 221, the inductance of the coils 2211 and 2215 is set to a large value, for example, 20 nH.

The gates of the n-type MOS transistors 2214 and 2218 receive the operating voltage Vb1. Nodes N1 and N2 receive input signals $V_i^+$ and $V_i^-$, whereas nodes N3 and N4 output output signals $V_o^+$ and $V_o^-$.

The LNA 221 receives, at the nodes N1 and N2, a signal from the antenna 21 as input signals Vi+ and Vi−, amplifies the received input signals $V_i^+$ and $V_i^-$, and outputs signals $V_o^+$ and $V_o^-$ from the nodes N3 and N4.

Figure 6:
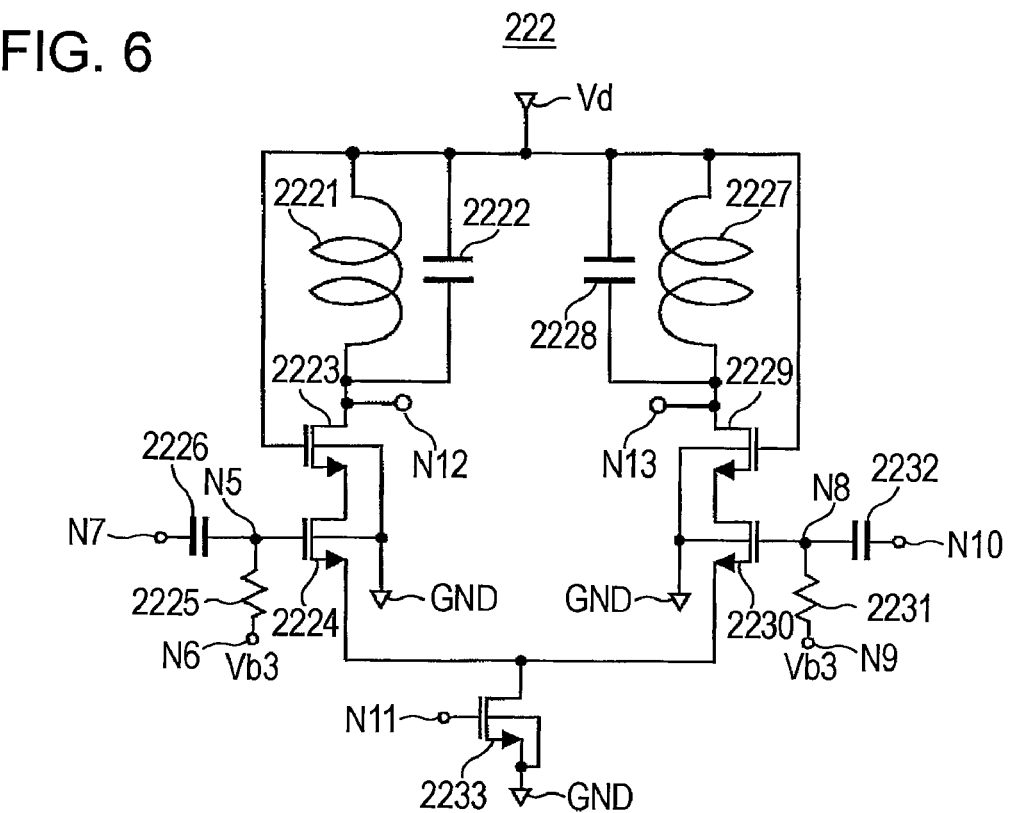
FIG. 6 is a circuit diagram illustrating a configuration of an amplifier illustrated in FIG. 4.

FIG. 6 is a circuit diagram illustrating a configuration of the amplifier 222 illustrated in FIG. 4. Referring to FIG. 6, the amplifier 222 includes coils 2221 and 2227, capacitors 2222, 2226, 2228, and 2232, n-type MOS transistors 2223, 2224, 2229, 2230, and 2233, and resistors 2225 and 2231.

The coil 2221 is connected between the power supply node Vd and a drain of the n-type MOS transistor 2223. The capacitor 2222 is connected in parallel to the coil 2221 between the power supply node Vd and the drain of the n-type MOS transistor 2223.

In the n-type MOS transistor 2223, the drain is connected to the coil 2221 and the capacitor 2222, the source is connected to a drain of the n-type MOS transistor 2224, and the gate is connected to the power supply node Vd.

In the n-type MOS transistor 2224, the drain is connected to the source of the n-type MOS transistor 2223, the source is connected to a drain of the n-type MOS transistor 2233, and the gate is connected to the resistor 2225 and the capacitor 2226.

The resistor 2225 is connected between a node N5, which is between the gate of the n-type MOS transistor 2224 and the capacitor 2226, and a node N6. The capacitor 2226 is connected between the node N5 and a node N7.

The coil 2227, the capacitor 2228, the n-type MOS transistors 2229 and 2230, the resistor 2231, and the capacitor 2232 are connected in the same manner as the coil 2221, the capacitor 2222, the n-type MOS transistors 2223 and 2224, the resistor 2225, and the capacitor 2226, respectively. In this case, the resistor 2231 is connected between nodes N8 and N9, and the capacitor 2232 is connected between the node N8 and a node N10.

In the n-type MOS transistor 2233, the drain is connected to the sources of the n-type MOS transistors 2224 and 2230, the source is connected to the ground node GND, and the gate is connected to a node N11.

The node N11 receives an operating voltage Vb2, and the nodes N6 and N9 receive an operating voltage Vb3. In this case, the operating voltage Vb2 is 600 mV, whereas the operating voltage Vb3 is 900 mV.

The nodes N7 and N10 receive input signals $V_i^+$ and $V_i^-$, respectively, and nodes N12 and N13 are configured to output the output signals $V_o^+$ and $V_o^-$, respectively.

The amplifier 222 is an amplifier in which resistance R and inductance L are high whereas capacitance C is low. The coils 2221 and 2227 have high resistance R and high inductance L, and the capacitors 2222 and 2228 have low capacitance C.

As a result, the amplifier 222 has an amplification factor that is independent of resistance R and that is determined by inductance L and capacitance C. More specifically, the amplifier 222 has an amplification factor proportional to $(L/C)^{1/2}$.

The coils 2221 and 2227 are constituted by a spiral conductive wire having a line width of 1 μm so that the resistance R and inductance L of the coils 2221 and 2227 are high.

Generally, an amplification factor is proportional to $(L/C)^{1/2}/R$. However, the amplification factor of the amplifier 222 is proportional to $(L/C)^{1/2}$.

Therefore, the amplification factor of the amplifier 222 increases by increasing the inductance L or by decreasing the capacitance C.

As described above, the amplifier 222 is an amplifier in which the amplification factor is determined by the inductance L and capacitance C.

Each of the amplifiers 223 to 227 has the same configuration as that of the amplifier 222 illustrated in FIG. 6.

Figure 7:
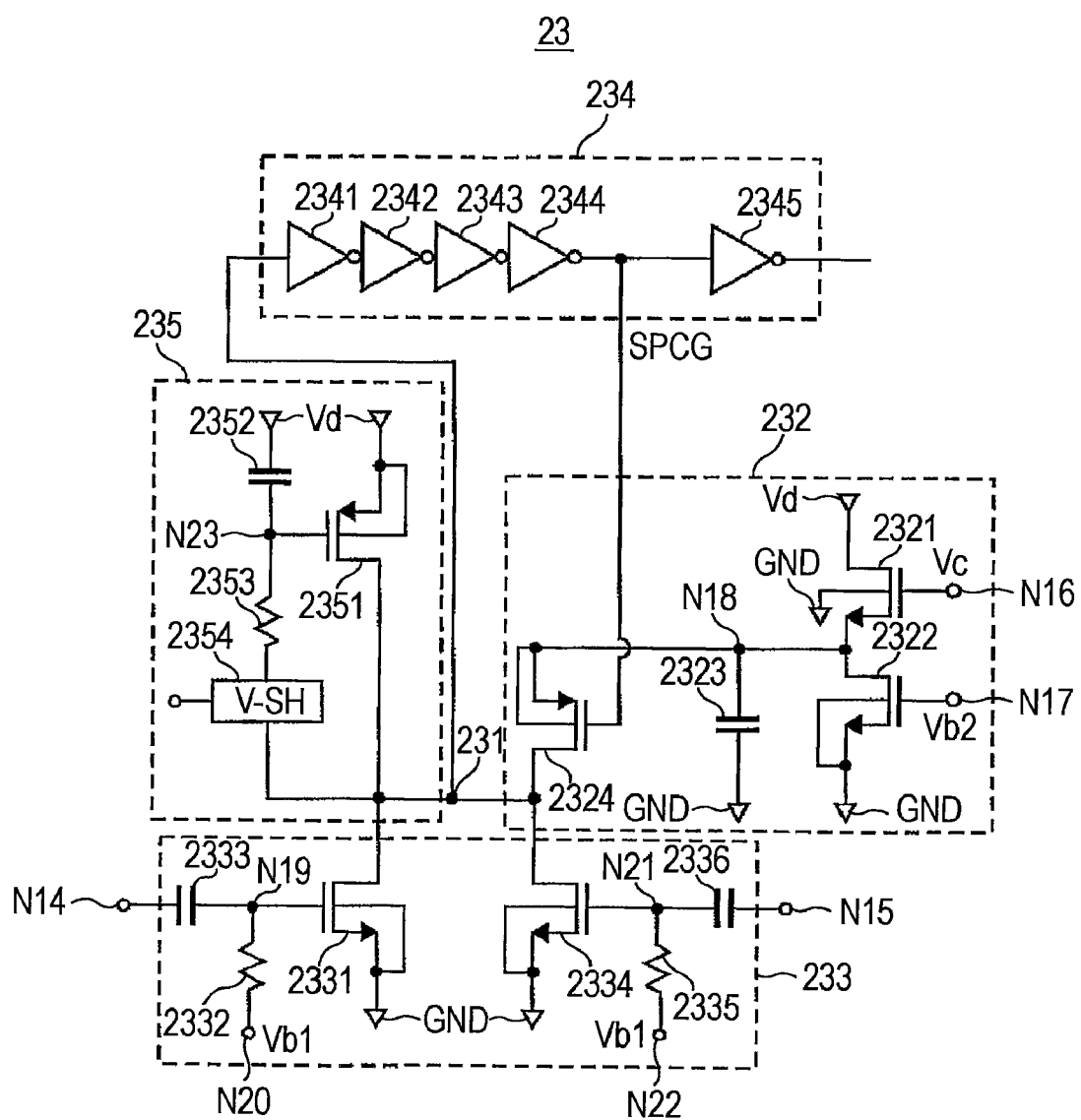
FIG. 7 is a circuit diagram illustrating a configuration of a receiving circuit (STSB-D) illustrated in FIG. 4.

FIG. 7 is a circuit diagram illustrating a configuration of the receiving circuit (STSB-D) 23 illustrated in FIG. 4. Referring to FIG. 7, the receiving circuit (STSB-D) 23 includes a node 231, a precharge circuit 232, a potential changing circuit 233, an output circuit 234, and a voltage adjusting circuit 235.

The precharge circuit 232 performs precharge to change the potential of the node 231 to a potential Va in accordance with an H-level signal from the output circuit 234.

Upon receiving a received signal from the amplifier 227 at nodes N14 and N15, the potential changing circuit 233 supplies charge accumulated in the node 231 to the ground node GND, so that the potential of the node 231 drops from the potential Va to 0 V.

The output circuit 234 detects the potential of the node 231 and outputs a logic signal composed of the detected potential to the precharge circuit 232. Also, the output circuit 234 outputs, as an output signal, a logic signal having an inverted logic level of the logic signal composed of the detected potential.

The voltage adjusting circuit 235 adjusts the voltage Va of the node 231 when precharge is performed on the node 231 by the precharge circuit 232.

The precharge circuit 232 includes n-type MOS transistors 2321 and 2322, a capacitor 2323, and a p-type MOS transistor 2324.

In the n-type MOS transistor 2321, the drain is connected to the power supply node Vd, the source is connected to a drain of the n-type MOS transistor 2322, and the gate is connected to a node N16.

In the n-type MOS transistor 2322, the drain is connected to the source of the n-type MOS transistor 2321, the source is connected to the ground node GND, and the gate is connected to a node N17.

The capacitor 2323 is connected between a node N18 and the ground node GND. In the p-type MOS transistor 2324, the source is connected to the node N18, the drain is connected to the node 231, and the gate is connected to the output circuit 234.

The n-type MOS transistor 2321 receives an operating voltage Vc from the node N16, whereas the n-type MOS transistor 2322 receives an operating voltage Vb2 from the node N17. In this case, the operating voltage Vc is 1.4 V, for example.

When turned on by the operating voltages Vc and Vb2, respectively, the n-type MOS transistors 2321 and 2322 supply current from the power supply node Vd to the node N18.

The capacitor 2323 smoothes the voltage on the node N18 and supplies the smoothed voltage to the p-type MOS transistor 2324.

The p-type MOS transistor 2324 is turned on upon receiving an L-level signal from the output circuit 234 and supplies the charge on the node N18 to the node 231.

In this way, when the p-type MOS transistor 2324 is turned on by a signal from the output circuit 234, the precharge circuit 232 supplies current from the power supply node Vd to the node 231, in order to perform precharge to change the potential of the node 231 to the potential Va.

The potential changing circuit 233 includes n-type MOS transistors 2331 and 2334, resistors 2332 and 2335, and capacitors 2333 and 2336.

In the n-type MOS transistor 2331, the drain is connected to the node 231, the source is connected to the ground node GND, and the gate is connected to the resistance 2332 and the capacitor 2333.

The resistor 2332 is connected between nodes N19 and N20. The capacitor 2333 is connected between the nodes N14 and N19.

The n-type MOS transistor 2334, the resistor 2335, and the capacitor 2336 are connected in the same manner as the n-type MOS transistor 2331, the resistor 2332, and the capacitor 2333.

The node N14 receives an input signal $V_i^+$, whereas the node N15 receives an input signal $V_i^-$. The nodes N20 and N22 receive an operating voltage Vb1. The operating voltage Vb1 is a voltage at the same level as that of a threshold voltage Vth to turn on the n-type MOS transistors 2331 and 2334.

When the nodes N14 and N15 receive an H-level received signal (RF pulse signal) as input voltages $V_i^+$ and $V_i^-$, the voltage on the nodes N19 and N21 becomes higher than the threshold voltage Vth, and n-type MOS transistors 2331 and 2334 are turned on, so that current flows from the node 231 to the ground node GND. As a result, the potential of the node 231 drops from the potential Va to 0 V.

When the nodes N14 and N15 receive an L-level signal (RF pulse signal) as input voltages $V_i^+$ and $V_i^-$, the voltage on the nodes N19 and N21 is maintained at a voltage of the same level as that of the threshold voltage Vth, and n-type MOS transistors 2331 and 2334 are turned off, so that no current flows from the node 231 to the ground node GND. As a result, the potential of the node 231 is maintained at the potential Va.

In this way, the potential changing circuit 233 decreases the potential on the node 231 from the potential Va to 0 V only when receiving an H-level signal (RF pulse signal) at the nodes N14 and N15.

The output circuit 234 includes inverters 2341 to 2345. The inverters 2341 to 2345 are connected in series. An input terminal of the inverter 2341 is connected to the node 231, and an output terminal of the inverter 2344 is connected to the gate of the p-type MOS transistor 2324.

When the potential of the node 231 is the potential Va, the output circuit 234 outputs an H-level signal to the gate of the p-type MOS transistor 2324, and outputs an L-level signal as an output signal.

On the other hand, when the potential of the node 231 is 0 V, the output circuit 234 outputs an L-level signal to the gate of the p-type MOS transistor 2324, and outputs an H-level signal as an output signal.

The voltage adjusting circuit 235 includes a p-type MOS transistor 2351, a capacitor 2352, a resistor 2353, and a level shifter (V-SH: Variable level Shifter) 2354.

In the p-type MOS transistor 2351, the source is connected to the power supply node Vd, the drain is connected to the node 231, and the gate is connected to a node N23.

The capacitor 2352 is connected between the power supply node Vd and the node N23. The resistor 2353 is connected between the node N23 and the level shifter 2354. The level shifter 2354 is connected between the node N23 and the node 231.

When the threshold voltage of the p-type MOS transistor 2351 is Vthp and when the power supply voltage of the power supply node Vd is Vdd, the p-type MOS transistor 2351, the capacitor 2352, and the resistor 2353 set the voltage on the node N23 to Vdd-Vthp.

The level shifter 2354 adjusts the potential on the node 231 to the potential Va when precharge is performed on the node 231 by the precharge circuit 232. The potential Va is Vth_iv+α when the threshold voltage of the inverters 2341 to 2345 is Vth_iv.

Figure 8:
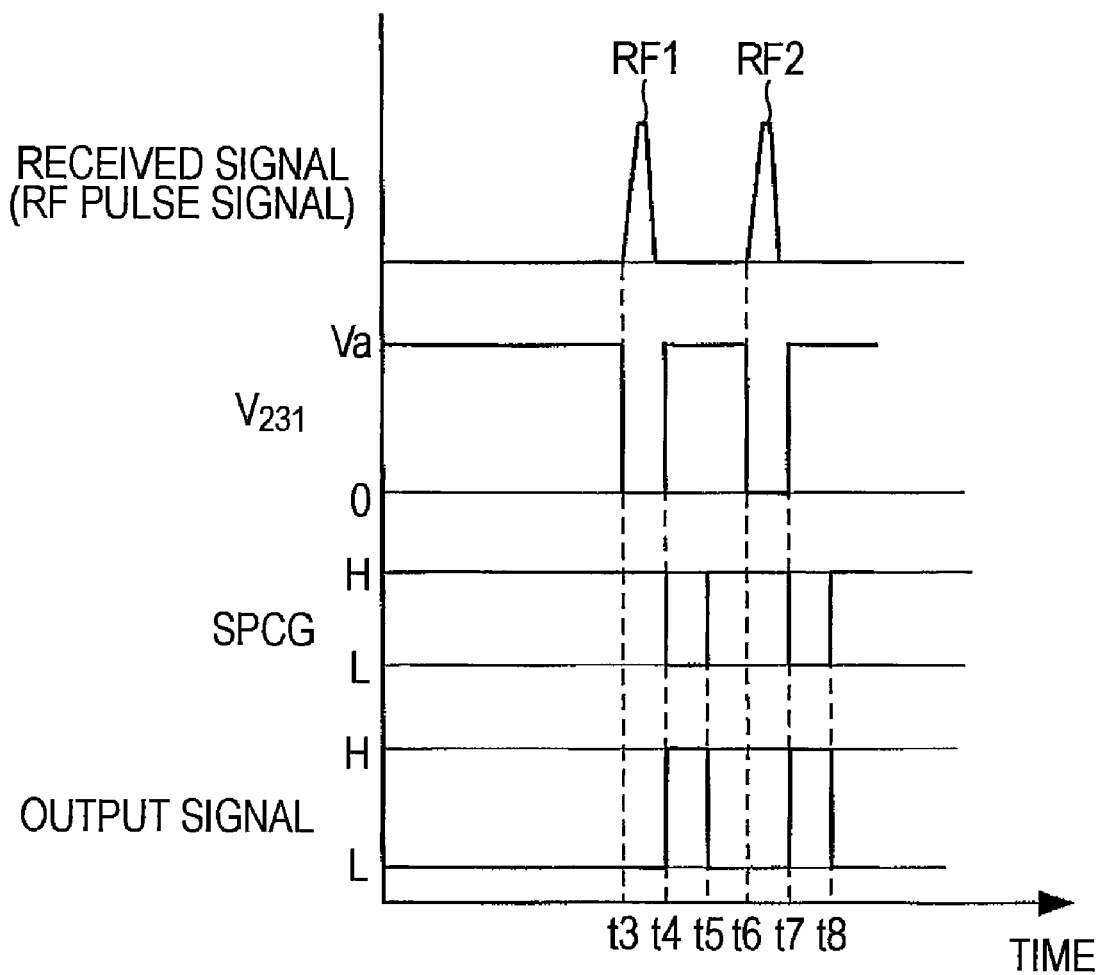
FIG. 8 is a timing chart of signals.

FIG. 8 is a timing chart of signals. Referring to FIG. 8, until timing t3 when an RF pulse signal RF1 of a received signal is input to the receiving circuit 23, a potential $V_{231}$ on the node 231 is held at the potential Va because precharge is being performed by the precharge circuit 232.

Then, when the RF pulse signal RF1 of the received signal is input to the receiving circuit 23 at timing t3, the potential changing circuit 233 applies current from the node 231 to the ground node GND in accordance with the RF pulse signal RF1, whereby the potential $V_{231}$ on the node 231 drops from the potential Va to 0 V.

Then, the output circuit 234 receives the potential (=0 V) on the node 231, delays the received potential (=0 V) by the four inverters 2341 to 2344, and outputs a self-precharge signal SPCG of an L level to the gate of the p-type MOS transistor 2324 of the precharge circuit 232 at timing t4.

Also, the output circuit 234 outputs an H-level output signal on the basis of the potential (=0 V) from timing t4 to timing t5.

Upon receiving the L-level self-precharge signal SPCG at timing t4, the p-type MOS transistor 2324 of the precharge circuit 232 is turned on from timing t4 to timing t5, so that the precharge circuit 232 performs precharge at timing t4 to change the potential $V_{231}$ of the node 231 to the potential Va. Thereafter, the potential $V_{231}$ of the node 231 is maintained at the potential Va until timing t6 when the receiving circuit 23 receives an RF pulse signal RF2.

At timing t6 when the receiving circuit 23 receives the RF pulse signal RF2, the potential changing circuit 233 applies current from the node 231 to the ground node GND in accordance with the RF pulse signal RF2, whereby the potential $V_{231}$ on the node 231 drops from the potential Va to 0 V.

Then, the output circuit 234 receives the potential (=0 V) on the node 231, delays the received potential (=0 V) by the four inverters 2341 to 2344, and outputs a self-precharge signal SPCG of an L level to the gate of the p-type MOS transistor 2324 of the precharge circuit 232 at timing t7.

Also, the output circuit 234 outputs an H-level output signal on the basis of the potential (=0 V) from timing t7 to timing t8.

Upon receiving the L-level self-precharge signal SPCG at timing t7, the p-type MOS transistor 2324 of the precharge circuit 232 is turned on from timing t7 to timing t8, so that the precharge circuit 232 performs precharge at timing t7 to change the potential $V_{231}$ of the node 231 to the potential Va. Thereafter, the potential $V_{231}$ of the node 231 is maintained at the potential Va.

As described above, the receiving circuit 23 applies current from the node 231 to the ground node GND and outputs an H-level output signal only when receiving the RF pulse signal RF1 or RF2. The receiving circuit 23 applies no current from the node 231 to the ground node GND when receiving no RF pulse signal.

Accordingly, a power loss can be minimized.

When the receiving circuit 23 receives the RF pulse signal RF1 or RF2, the potential $V_{231}$ on the node 231 drops from the potential Va to 0 V, and therefore an output signal can be output in synchronization with the reception of the RF pulse signal RF1 or RF2 without providing a synchronization circuit.

Furthermore, after a certain time (delay time caused by the four inverters 2341 to 2344) has elapsed from the timing when the potential $V_{231}$ on the node 231 drops from the potential Va to 0 V, the inverter 2344 outputs an L-level self-precharge signal SPCG to the p-type MOS transistor 2324, so that the precharge circuit 232 performs precharge on the node 231 in accordance with the L-level self-precharge signal SPCC.

Therefore, after an RF pulse signal has been detected, precharge of the node 231 can be automatically performed for the reception of a next RF pulse signal.

Figure 9:
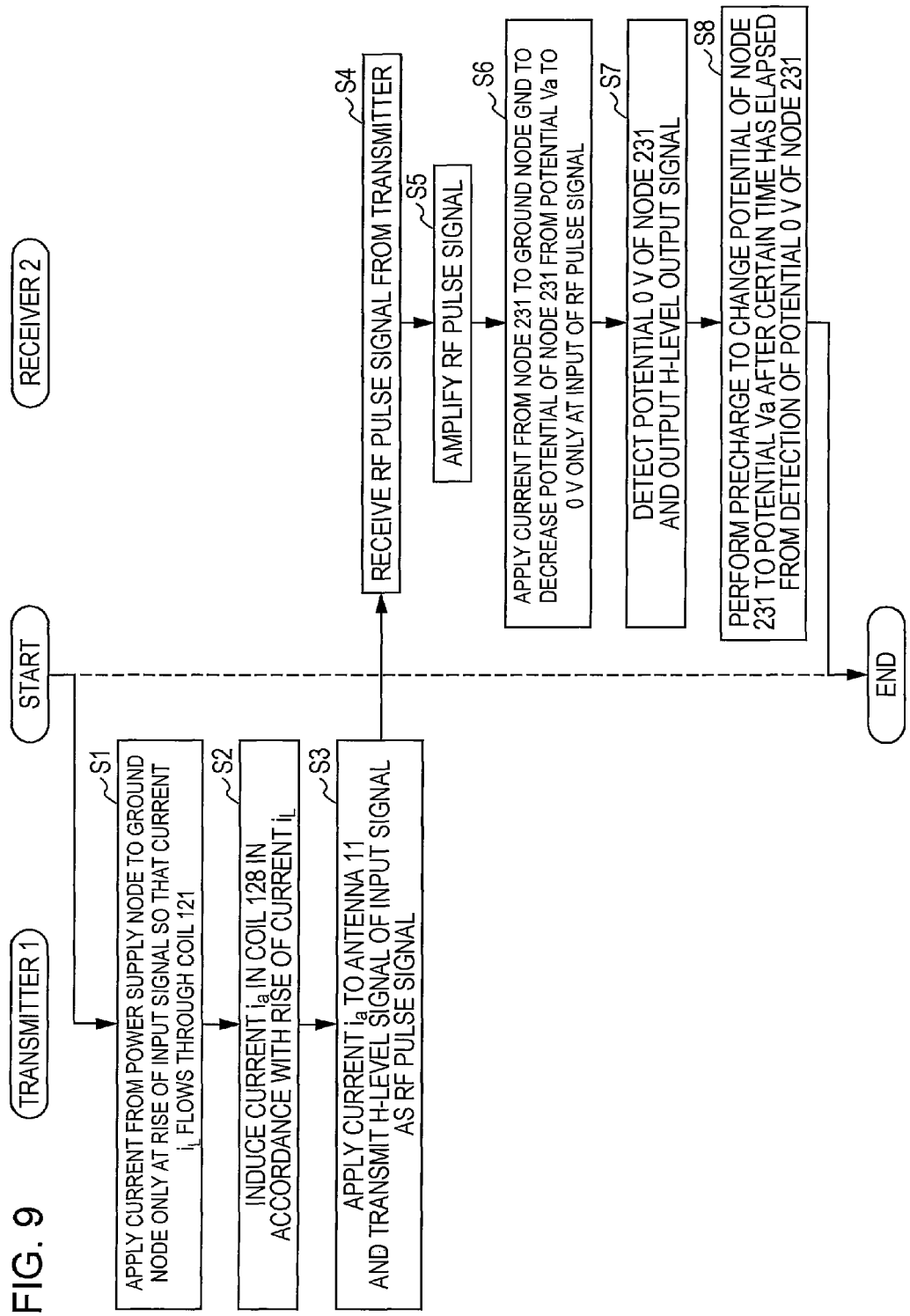
FIG. 9 is a flowchart illustrating operations in the radio communication system illustrated in FIG. 1.

FIG. 9 is a flowchart illustrating operations in the radio communication system 10 illustrated in FIG. 1.

Referring to FIG. 9, upon start of a series of operations, the transmitting circuit 12 in the transmitter 1 applies current from the power supply node Vd to the ground node GND so that a current $i_L$ flows through the coil 121 only at a rise of an input signal in the above-described method (step S1).

Then, the transmitting circuit 12 induces a current $i_a$ in the coil 128 in accordance with a rise of the current $i_L$ (step S2). Then, the transmitting circuit 12 applies the induced current $i_a$ to the antenna 11 and transmits an H-level signal of the input signal as an RF pulse signal (step S3).

The antenna 21 of the receiver 2 receives the RF pulse signal transmitted from the transmitter 1 (step S4) and outputs the received RF pulse signal to the amplifier circuit 22. The amplifier circuit 22 amplifies the RF pulse signal received from the antenna 21 (step S5) and outputs the amplified RF pulse signal to the receiving circuit 23. In this case, the amplifiers 222 to 227 amplify the RF pulse signal at an amplification factor proportional to $(L/C)^{1/2}$.

Subsequently, the receiving circuit 23 of the receiver 2 allows the potential changing circuit 233 to decrease the potential of the node 231 from the potential Va to 0 V in synchronization with an input of an RF pulse signal (step s6).

Accordingly, the output circuit 234 of the receiving circuit 23 detects the potential 0 V of the node 231 and outputs an H-level output signal on the basis of the detected potential 0 V (step S7).

The output circuit 234 of the receiving circuit 23 generates an L-level self-precharge signal SPCG after a certain time (delay time caused by the inverters 2341 to 2344) has elapsed after detecting the potential 0 V of the node 231 and outputs the generated L-level self-precharge signal SPCG to the p-type MOS transistor 2324 of the precharge circuit 232. Then, the p-type MOS transistor 2324 is turned on in accordance with the L-level self-precharge signal SPCG, and the precharge circuit 232 performs precharge to change the potential of the node 231 to the potential Va (step S8). Accordingly, the series of operations end.

The transmitter 1 and the receiver 2 repeatedly perform steps S1 to S8 illustrated in FIG. 9, whereby the transmitter 1 sequentially transmits RF pulse signals to the receiver 2 in synchronization with only a rise of an input signal and the receiver 2 receives the RF pulse signals and outputs an H-level output signal. The transmitter 1 does not transmit an RF pulse signal to the receiver 2 at the time other than a rise of an input signal, and the receiver 2 performs a receiving operation of an RF pulse signal only at the reception of an RF pulse signal.

Therefore, according to the present invention, power consumption in the transmitter 1 and the receiver 2 can be minimized.

In the transmitter 1, current flows from the power supply node Vd to the ground node GND only at a rise of an input signal, so that a power loss in the transmitter 1 can be minimized.

Furthermore, in the receiver 2, current flows from the node 231 to the ground node GND only at the reception of an RF pulse signal, so that a power loss in the receiver 2 can be minimized.

Figure 10:
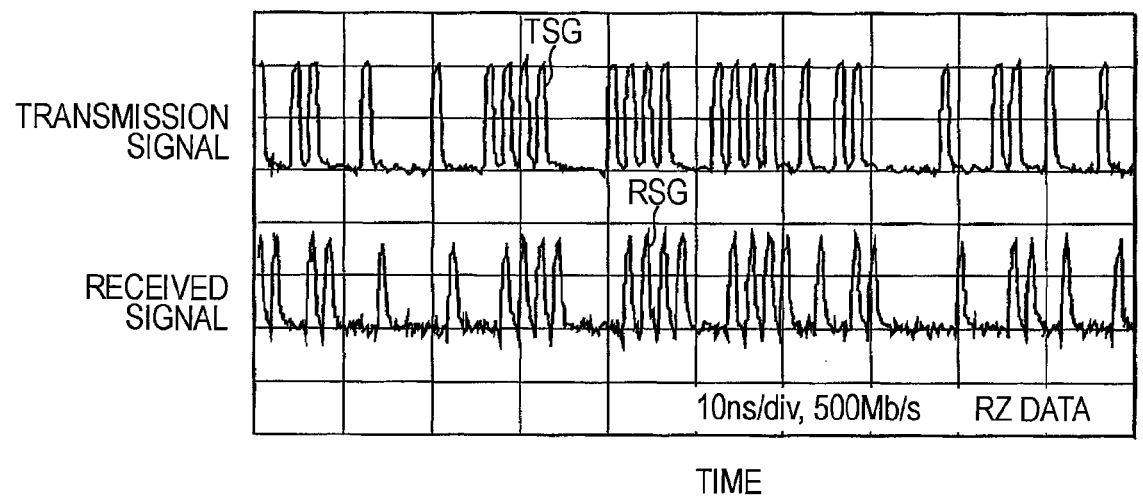
FIG. 10 illustrates a communication characteristic in the radio communication system illustrated in FIG. 1.

FIG. 10 illustrates a communication characteristic in the radio communication system 10 illustrated in FIG. 1. In FIG. 10, the horizontal axis indicates time whereas the vertical axis indicates a transmission signal and a received signal. In the horizontal axis, one scale unit indicates 10 ns. The transmission rate is 500 Mb/s, and the input signal includes RZ data.

Referring to FIG. 10, the transmission signal TSG includes RF pulse signals, whereas the received signal RSG includes RF pulse signals corresponding to the respective RF pulse signals of the transmission signal TSG.

Therefore, it is understood that a signal can be accurately transmitted from the transmitter 1 to the receiver 2 at a transmission rate of 500 Mb/s.

Figure 11:
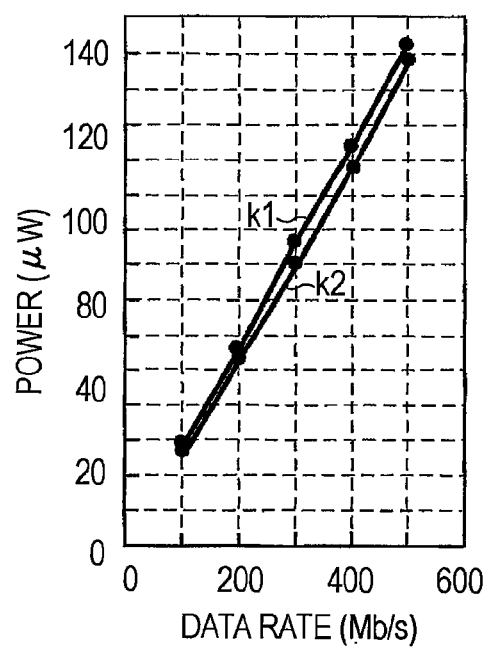
FIG. 11 illustrates a relationship between power and data rate in the transmitter.
Figure 10:
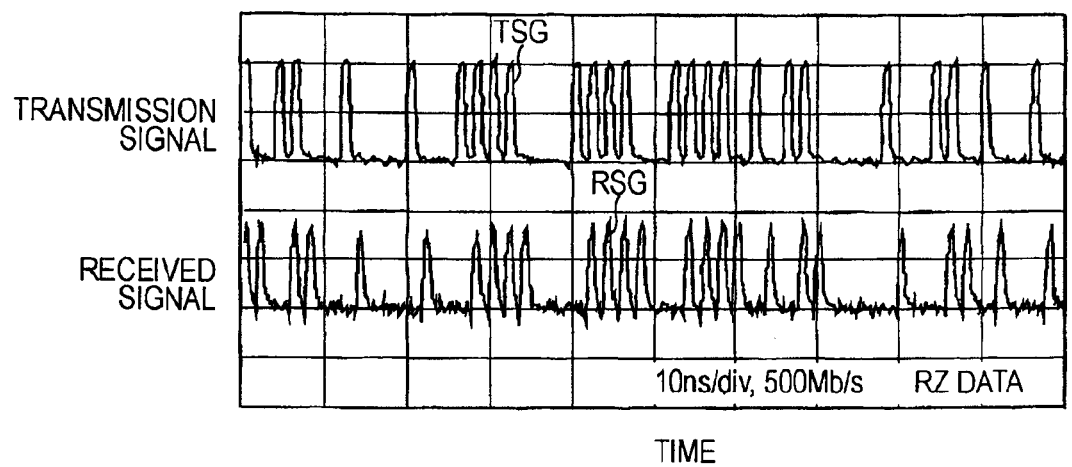
Figure 11:
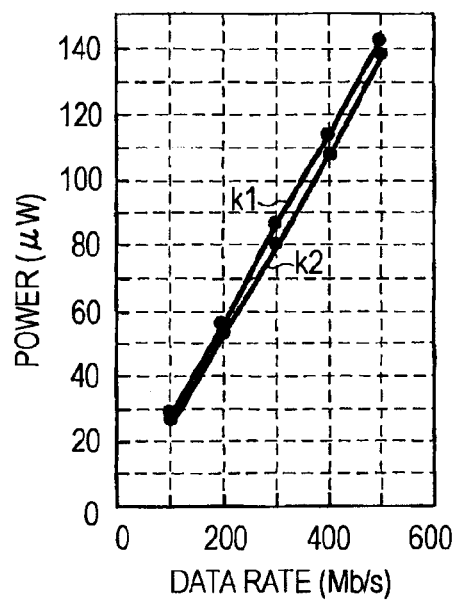

FIG. 11 illustrates a relationship between power and a data rate in the transmitter 1. In FIG. 11, the vertical axis indicates power, whereas the horizontal axis indicates a data rate. A curve k1 indicates a relationship between power consumption and a data rate in the n-type MOS transistors 123 and 124, whereas a curve k2 indicates a relationship between power consumption and a data rate in the inverters 125 to 127.

Referring to FIG. 11, the power consumption in the n-type MOS transistors 123 and 124 and the power consumption in the inverters 125 to 127 increase from about 30 µW to about 140 µW when the data rate increases from 100 Mb/s to 500 Mb/s.

As can be understood, in the transmitter 1 according to the present invention, the power consumption is low of 140 µW or less even if the data rate increases to 500 Mb/s.

On the other hand, the power consumption in the receiver 2 was 11 mW.

Accordingly, it has been verified that the radio communication system 10 according to the present invention has low power consumption.

Table 1 shows a relationship between a data rate and a bit error rate.

TABLE 1

| Distance | 250 Mb/s | 500 Mb/s |
|---|---|---|
| 30 cm | $<10^{-4}$ | $<10^{-3}$ |
| 40 cm | $<10^{-3}$ | — |

When the distance between the transmitter 1 and the receiver 2 was 30 cm, the bit error rate lower than $10^{-4}$ was obtained at the data rate of 250 Mb/s, and the bit error rate lower than $10^{-3}$ was obtained at the data rate of 500 Mb/s.

When the distance between the transmitter 1 and the receiver 2 was 40 cm, the bit error rate lower than $10^{-3}$ was obtained at the data rate of 250 Mb/s.

Therefore, it has been verified that the radio communication system 10 exhibits a high-performance communication characteristic in radio communication in a sub-meter distance.

Each of the above-described transmitter 1 and receiver 2 is formed as a semiconductor chip. The transmitter 1 has a size of about 300 µm square, and the receiver 2 has a size of about 800 µm×360 µm (=area of 0.29 mm$^2$) when including the six stages of amplifiers 222 to 227.

As described above, each of the transmitter 1 and the receiver 2 has a size of a semiconductor chip.

In the present invention, the precharge means supplying charge to a node to increase the potential of the node.

In the present invention, the receiving circuit 23 may include a circuit in which the n-type MOS transistors 2321, 2322, 2331, and 2334 are replaced with p-type MOS transistors, and in which the p-type MOS transistors 2324 and 2351 are replaced with n-type MOS transistors.

Furthermore, in the present invention, the coil 121 constitutes a "first coil", and the coil 128 constitutes a "second coil".

Furthermore, in the present invention, the potential Va serves as a "first potential", and the potential 0 V serves as a "second potential".

The embodiment disclosed herein is only an example in every point and should be considered as nonrestrictive. The scope of the present invention is indicated by the claims, not by the above-described embodiment, and is intended to encompass all modifications within the scope of the claims and equivalents thereof.

INDUSTRIAL APPLICABILITY

The present invention is applied to a radio communication system with low power consumption and high communication performance. Also, the present invention is applied to a transmitter used for the radio communication system with low power consumption and high communication performance. Furthermore, the present invention is applied to a receiver used for the radio communication system with low power consumption and high communication performance. Furthermore, the present invention is applied to a transmitting circuit used for the radio communication system with low power consumption and high communication performance. Furthermore, the present invention is applied to a receiving circuit used for the radio communication system with low power consumption and high communication performance.

The invention claimed is:

1. A radio communication system performing radio communication in an ultra wide band radio transmission method, the radio communication system comprising:
   a transmitter applying current from a power supply node to a ground node through a first coil only at a rise of an input signal including a pulse signal thereby inducing an induced current having a pulse waveform with a pulse width shorter than a pulse width of the pulse signal in a second coil different from the first coil, applying the induced current to an antenna, and transmitting a transmission signal having the pulse waveform by radio communication; and
   a receiver detecting a change in potential of a potential detection node by applying current from the potential detection node to a ground node only at reception of the transmission signal transmitted from the transmitter and receiving the transmission signal, wherein
   the transmitter includes
      a first antenna,
      the first coil one end of which is connected to the power supply node,
      first and second MOS transistors cascaded between the other end of the first coil and the ground node,
      a delay circuit connected between a gate of the first MOS transistor and a gate of the second MOS transistor, and
      the second coil facing the first coil and being connected to the first antenna, wherein
      the first MOS transistor is turned on in accordance with a rise of the input signal and applies current from the power supply node to the ground node through the first coil,
      the second MOS transistor is in an on-state until a certain time elapses after the first MOS transistor has been turned on, and
      the delay circuit turns off the second MOS transistor after the certain time has elapsed from the turn on of the first MOS transistor,
   the receiver includes
      a second antenna, and
      a receiving circuit detecting a change in potential of the potential detection node from a first potential to a second potential by applying current from the potential detection node to the ground node in synchronization with reception of the transmission signal by the second antenna and outputting a received signal of the transmission signal on the basis of the second potential,
   the receiving circuit includes
      the potential detection node,
      a third MOS transistor being connected between the potential detection node and the ground node, changing the potential of the potential detection node from the first potential to the second potential by applying current from the potential detection node to the ground node when the second antenna receives the transmission signal of a first logic level, and stopping a flow of the current from the potential detection node to the ground node when the second antenna receives the transmission signal of a second logic level, which is an inverted level of the first logic level, and maintaining the potential of the potential detection node at the first potential,
      an output circuit being connected to the potential detection node, detecting the second potential of the potential detection node, and outputting, as an output signal, a logic signal generated by inverting a logic signal composed of the detected second potential, and
      a precharge circuit being connected between a power supply node and the potential detection node and performing precharge to change the potential of the potential detection node to the first potential by receiving the logic signal of the second potential from the output circuit after a certain time has elapsed from the detection of the second potential by the output circuit.

2. The radio communication system according to claim 1, wherein the precharge circuit stops the precharge for a receiving period of the transmission signal, the receiving period being the certain time, and performs the precharge after reception of the transmission signal has ended.

3. The radio communication system according to claim 1, wherein the receiver further includes an amplifier circuit having an amplification factor independent of resistance and dependent on inductance and capacitance, amplifying the received signal received by the second antenna, and outputting the amplified received signal to a gate of the third MOS transistor of the receiving circuit.

4. The radio communication system according to claim 3, wherein the amplification factor of the amplifier circuit increases when the inductance increases or when the capacitance decreases.

5. A transmitter used for a radio communication system performing radio communication in an ultra wide band radio transmission method, the transmitter comprising:

an antenna; and a transmitting circuit applying current from a power supply node to a ground node through a first coil only at a rise of an input signal including a pulse signal thereby inducing an induced current having a pulse waveform with a pulse width shorter than a pulse width of the pulse signal in a second coil different from the first coil, applying the induced current to the antenna, and transmitting a transmission signal having the pulse waveform by radio communication, wherein the transmitting circuit includes the first coil having one end connected to the power supply node, first and second MOS transistors being cascaded between the other end of the first coil and the ground node, a delay circuit being connected between a gate of the first MOS transistor and a gate of the second MOS transistor, and the second coil facing the first coil and being connected to the antenna, wherein the first MOS transistor is turned on in accordance with a rise of the input signal and applies current from the power supply node to the ground node through the first coil, the second MOS transistor is in an on-state until a certain time elapses after the first MOS transistor has been turned on, and the delay circuit turns off the second MOS transistor after the certain time has elapsed from the turn on of the first MOS transistor.

6. A receiver used for a radio communication system performing radio communication in an ultra wide band radio transmission method, the receiver comprising:

an antenna; and a receiving circuit detecting a change in potential of a potential detection node by applying current from the potential detection node to a ground node in synchronization with reception of a transmission signal by the antenna and outputting a received signal of the transmission signal, wherein the receiving circuit includes the potential detection node, a MOS transistor being connected between the potential detection node and the ground node, changing the potential of the potential detection node from a first potential to a second potential by applying current from the potential detection node to the ground node when the antenna receives the transmission signal of a first logic level, and stopping a flow of the current from the potential detection node to the ground node when the antenna receives the transmission signal of a second logic level, which is an inverted level of the first logic level, and maintaining the potential of the potential detection node at the first potential, an output circuit being connected to the potential detection node, detecting the second potential of the potential detection node, and outputting, as an output signal, a logic signal generated by inverting a logic signal composed of the detected second potential, and a precharge circuit being connected between a power supply node and the potential detection node and performing precharge to change the potential of the potential detection node to the first potential by receiving the logic signal composed of the second potential from the output circuit after a certain time has elapsed from the detection of the second potential by the output circuit.

7. A transmitting circuit comprising:

a first coil having one end connected to a power supply node;

first and second MOS transistors cascaded between the other end of the first coil and a ground node;

a delay circuit connected between a gate of the first MOS transistor and a gate of the second MOS transistor; and a second coil facing the first coil and being connected to an antenna, wherein the first MOS transistor is turned on in accordance with a rise of an input signal including a pulse signal and applies current from the power supply node to the ground node through the first coil, the second MOS transistor is in an on-state until a certain time elapses after the first MOS transistor has been turned on, and the delay circuit turns off the second MOS transistor after the certain time has elapsed from the turn on of the first MOS transistor.

8. A receiving circuit comprising:

a potential detection node;

a MOS transistor being connected between the potential detection node and a ground node, changing a potential of the potential detection node from a first potential to a second potential by applying current from the potential detection node to the ground node when an antenna receives a transmission signal of a first logic level, and stopping a flow of the current from the potential detection node to the ground node when the antenna receives the transmission signal of a second logic level, which is an inverted level of the first logic level, and maintaining the potential of the potential detection node at the first potential;

an output circuit being connected to the potential detection node, detecting the second potential of the potential detection node, and outputting, as an output signal, a logic signal generated by inverting a logic signal composed of the detected second potential; and a precharge circuit being connected between a power supply node and the potential detection node and performing precharge to change the potential of the potential detection node to the first potential by receiving the logic signal composed of the second potential from the output circuit after a certain time has elapsed from the detection of the second potential by the output circuit.

* * * * *

UNITED STATES PATENT AND TRADEMARK OFFICE
CERTIFICATE OF CORRECTION

PATENT NO. : 7,974,648 B2  
APPLICATION NO. : 12/665264  
DATED : July 5, 2011  
INVENTOR(S) : Sasaki Page 1 of 2

It is certified that error appears in the above-identified patent and that said Letters Patent is hereby corrected as shown below:

On Title Page 2, in Item [56] under "OTHER PUBLICATIONS", in Column 1, Line 6, delete "ISCC" and insert -- ISSCC --, therefor.

In the Drawings:

In the drawings, Fig. 11 should be replaced with the corrected Fig. 11 as shown on the attached pages.

In Fig. 11, Sheet 7 of 7, on Y-axis "POWER (µW)", between 40 and 80, 60 is missing.

Signed and Sealed this  
Twenty-seventh Day of August, 2013

Teresa Stanek Rea  
*Acting Director of the United States Patent and Trademark Office*